United States Patent [19]

Fechner

[11] Patent Number: 4,812,927
[45] Date of Patent: Mar. 14, 1989

[54] HEAD-TO-DISK INTERFERENCE DETECTOR

[75] Inventor: Jimmy R. Fechner, Broomfield, Colo.

[73] Assignee: Storage Technology Corporation, Louisville, Colo.

[21] Appl. No.: 117,632

[22] Filed: Nov. 5, 1987

[51] Int. Cl.$^4$ ............................................. G11B 21/02
[52] U.S. Cl. ...................................... 360/75; 360/103; 360/137
[58] Field of Search .......................... 360/75, 103, 137

[56] References Cited

U.S. PATENT DOCUMENTS 4,605,977 8/1986 Matthews ........................ 360/75 X Primary Examiner—A. J. Heinz
Attorney, Agent, or Firm—Woodcock Washburn Kurtz Mackiewicz & Norris

[57] ABSTRACT

A method and apparatus for detecting mechanical interaction in a disk drive system which includes one or more rotatable disks, one or more radially movable heads cooperating with the disks for transfer of data there between, and a carriage for supporting the heads, has a waveguide, coupled to the carriage, for conducting acoustic stress waves corresponding to the mechanical interaction. The acoustic stress waves conducted from the carriage are then preamplified and selectively filtered before being fed to a signal processor and waveform analyzer. In such a manner, specific frequencies or ranges of frequencies of interest, each of which correspond to a particular mechanical interaction are analyzed by the waveform analyzer.

26 Claims, 2 Drawing Sheets

HEAD-TO-DISK INTERFERENCE DETECTOR

BACKGROUND OF THE INVENTION

This invention relates generally to magnetic disk drive systems, and more particularly to methods and apparatus for the detection of interference between the head and recording disks of a head/disk assembly in such systems.

In typical magnetic disk drive systems, where the recording disk moves relative to the head, it is usually desirable to space the head close to but not in contact with the recording disk. This close spacing is particularly important in systems where the recorded data is in the form of magnetic bits, since the spacing between the recording disk and the head determines the maximum bit density and hence the storage capacity that can be achieved. Conversely, continuous or intermittent contact between the head and the recording disk produces undue wear, the accumulation of dirt and results in the degradation of the recorded signal.

It is well known that the rapid relative movement of the recording disk and the head generates a laminar air flow or gas fluid layer between them. The rapidly moving fluid layer may be used to cause a head to "fly" or float at a given distance above the recording disk, the prior art being replete with methods by which a head may be caused to "fly" by utilizing a fluid bearing However, many problems are encountered in devising practical fluid bearing means for controlling the relative position of a head and a recording disk, the relative speed of the head and recording disk in some cases being too low for sustaining a fluid bearing. Alternatively, a high relative speed may make such arrangements susceptible to acceleration forces that can be induced by vibrational and positional changes.

It is clear that systems which must rely on fluid bearing arrangements, for relative positioning of the head or heads, are susceptible not only to erratic positioning of the head or heads, but also undesirable "crashing" of the head or heads on the surface of the recording disk. Furthermore, unless special precautions are taken, there is deleterious rubbing contact between the head and the recording disk while starting an stopping the apparatus. Such rubbing contact is especially susceptible in recording disks having "asperities" or irregularities in their surfaces.

There are many quality control arrangements, both in the production of magnetic disk drives and in the production of the recording disks themselves, to determine whether the disk drive or disk is susceptible to interference therebetween during operation of the head/disk assembly. However, no such simple arrangement exists in the prior art for the detection of head/disk interference in the field.

SUMMARY OF THE INVENTION

Accordingly, it is a general object of the present invention to provide a method and apparatus for the detection of head/disk interference in magnetic disk drive systems. More specifically, it is an object of the present invention to provide a method and apparatus for the detection of head-to-disk interference which is portable, and thus capable of being used by technicians in the field Another object of the present invention is to provide a method and apparatus for the detection of head-to-disk interference in disk drive systems, wherein the apparatus is incorporated within the disk drive system such that a technician in the field can readily and easily test the head/disk assemblies in such systems for problems associated with head-to-disk interference.

Briefly, these and other objects according to the present invention are accomplished in a disk drive system by a head/disk assembly including a plurality of rotatable recording disks, a plurality of radially movable heads cooperating therewith, and carriage means for supporting the heads. Means are coupled to the carriage means for conducting acoustic stress waves, corresponding to vibrations caused by head-to-disk interference, therefrom, and transducer means are also coupled to the conducting means for sensing the acoustic stress waves and for outputting a signal proportional thereto to processing means. The processing means are thus connected to receive the signal from the transducer means for determining the degree of head-to-disk interaction, and to output a second signal to means for displaying the second signal such that a technician in the field may diagnose and repair problems associated with such interaction.

In a preferred embodiment of the present invention, the carriage means includes a threaded bore which is adapted to receive the conducting means comprised of a waveguide preferably formed of an aluminum rod having an acoustic wave conductivity similar to the material comprising the carriage means. The transducer means is thus coupled to the rod for transmission of the first signal which is associated with acoustic stress waves caused by interaction between the head or heads and recording disk. Thereafter, the processing means, comprised in the preferred embodiment of an amplifier, filter, and demodulator means including an absolute value detector and another filter, receives the first signal and conditions it such that it can be fed to display means preferably comprising a waveform analyzer. In such a manner, frequency analysis or time domain analysis may be performed on the second signal, with the signal being time averaged to remove unwanted noise, in order that the amplitude of the acoustic stress waves may be determined since the amplitude thereof is a function of the amount of energy exchange in the form of interaction between the head or heads and recording disk.

The above and other objects, advantages, and novel features according to the present invention will become more apparent from the following detailed description of a preferred embodiment when considered in conjunction with the accompanying drawings wherein:

DETAILED DESCRIPTION OF THE PREFERRED EMBODIMENT

Figure 1:
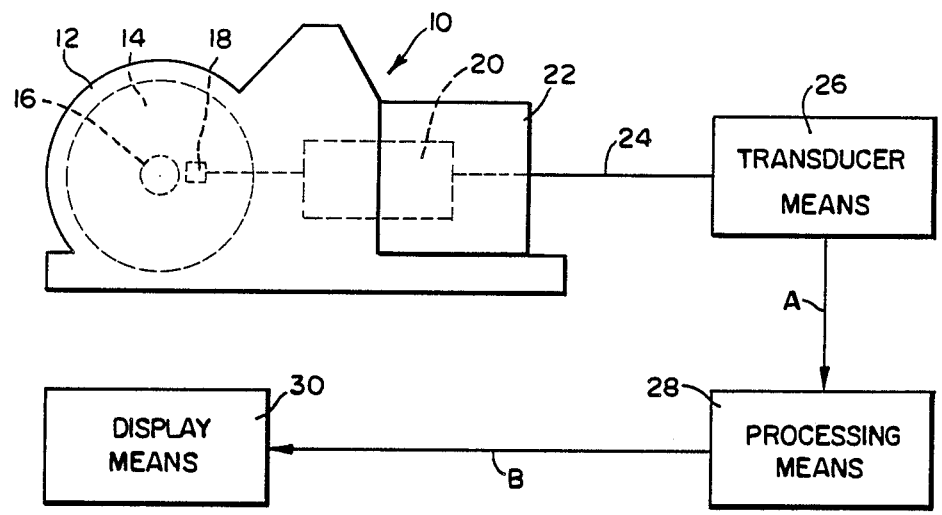
FIG. 1 diagrammatically illustrates a field portable head-to-disk interference detector according to the present invention.

Referring now to the drawings, wherein like characters designate like or corresponding parts throughout the several views, there is shown in FIG. 1 a conventional disk drive system 10 in which the present invention ma be incorporated. One such disk drive system is the Model 8380, manufactured by the assignee of the present invention. As is conventional, the system 10 includes a head/disk assembly 12 with a plurality of recording disks 14 (only one of which is shown for purposes of clarity) mounted for rotation on a spindle 16. The head/disk assembly 12 further includes one or more conventional read/write heads 18 which are moved into and out of juxtaposition with the recording disks 14 by a carriage 20 driven by a linear motor 22.

As is well known, interference between the recording disks 14 and the heads 18 can cause distortion in the signals which are recorded upon the recording disks 14, and can further cause substantial damage to the head/disk assembly 12 if such interference continues in the form of rubbing contact between the recording disks 14 and the heads 18. As a result, it is extremely desirable to be able to detect such interference, especially in the field by technicians assigned to diagnose and repair such disk drive systems. Often times, the carriage 20 of typical disk drive systems such as the Model 8380 manufactured by Storage Technology Corporation or the Model 3380 manufactured by IBM Corporation include a threaded bore at the face of the carriage 20 remote from the heads 18, the bore being used during movement or transportation of the disk drive system to immobilize the carriage 20 in order to protect its components.

In accordance with one important aspect of the present invention, therefore, means 24 are coupled to the carriage 20 for conducting acoustic stress waves therefrom, the conducting means preferably comprising a waveguide in the form of an aluminum rod. Since such acoustic stress waves correspond to vibrations caused by interaction between the recording disks 14 and the heads 18, the conducting means 24 transmits them to a transducer means 26 coupled thereto for processing and analysis by processing mean 28 and display means 30. While an aluminum rod is preferred for the conducting means 24 due to its impedance matching characteristics, its strength, and its machinability, it should be noted at this juncture that any suitable acoustic waveguide may be utilized within the teachings of the present invention. For example, the carriage 20 in typical disk drive systems is formed primarily of magnesium. In such cases, therefore, a magnesium rod could be utilized to minimize attenuation of the acoustic stress waves conducted therefrom, and thus optimize the performance of a detector incorporating such conducting means. Threads formed on a magnesium rod, however, would be liable to be galled causing undesirable particulate matter to be projected within the head/disk assembly 12 thereby causing a disadvantage which would far outweigh the benefits of its improved acoustic coupling.

The conducting means 24 is coupled to the carriage 20 by any suitable means which ensures proper transmission of the acoustic stress waves from the carriage 20 to the conducting means 24. In the preferred embodiment of the present invention, the carriage 20 includes the previously described bore (not shown) into which the conducting means (i.e, the rod) 24 is threaded. It should be noted at this juncture, furthermore, that the transducer means 26, as well as the conducting means 24, should provide good impedance matching. That is, as is well known, when two dissimilar metals are coupled to one another, there exists some reflection of the waves propagated through such metals at their interface. Such reflection of the waves would cause an undesirable amount of echoes on the waveform during analysis which would foster an improper determination of the pulse height of the waveform. Accordingly, the transducer means 26 is preferably comprised of a "PICO" type sensor which is attached to the end of the rod in order to achieve an optimum coupling of the travelling acoustic wave. One such suitable sensor, which includes a PZT-5A crystal, is manufactured by Physical Acoustics Corporation of Newark, N.J.

Figure 2:
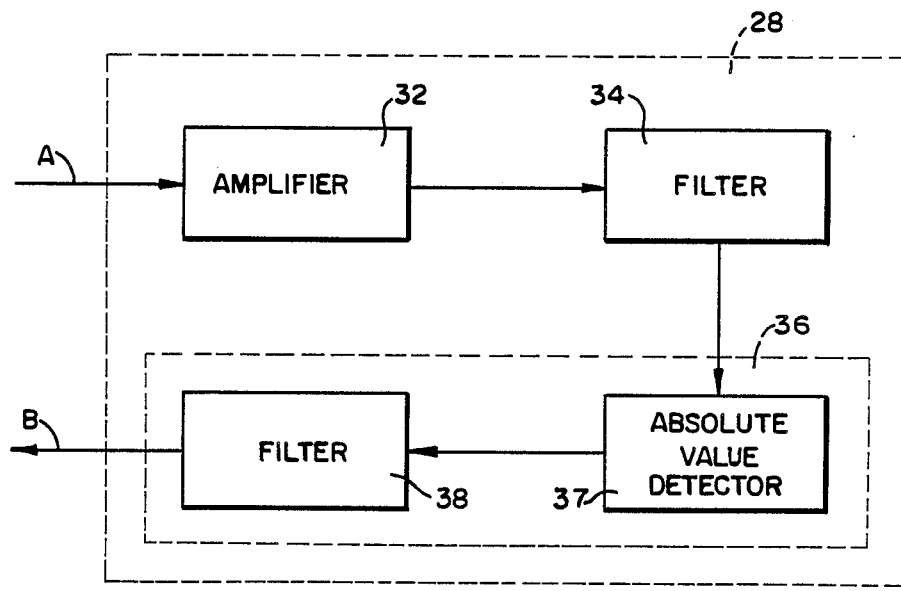
FIG. 2 shows a block diagram of the processing means illustrated in FIG. 1.

The processing means 28, as shown in greater detail in FIG. 2, is comprised generally of various signal processing circuitry adapted to receive a signal A from the transducer means 26, the signal A corresponding to acoustic stress waves conducted from the carriage 20 and caused by interactions between the recording disks 14 and heads 18. An amplifier 32 is first utilized to increase the gain of the signal A. The amplified signal provided for by the amplifier 32 is then filtered by a high-pass filter 34. The high-pass filter 34 in the preferred embodiment of the present invention filters those frequencies above 20 kilohertz, since those frequencies below 20 kilohertz are related to vibrations or resonances occurring in the head/disk assembly 12 due to causes other than head/disk interaction.

Thereafter, the amplified and filtered signal is passed to demodulator means 36 which includes an absolute value detector 37 and another filter 38. In accordance with the preferred embodiment of the present invention, a conventional absolute value detector 37 (which is also known as a full-wave rectifier) is utilized in the demodulator means 36 since it is desirable to preserve the information content of the signal A to as great an extent as is possible. Because the amplitude or pulse height of the amplified, filtered and demodulated form of the signal A (i.e., after it has exited the demodulator means 36) is a function of the degree of interaction between the recording disks 14 and the heads 18, the acoustic wave processed by the processing means 28 is also a function of the energy exchange between such disks 14 and heads 18. Accordingly, the signal is thereafter low-pass filtered by the filter means 38 in order to produce a signal which can be time averaged in external processing means as will be explained in greater detail herein below.

The signal B is then fed to the display means 30 for analysis by the field technician. This display means 30 can be utilized to perform frequency or time domain analysis, and is suitably comprised of a conventional waveform analyzer, such as the Model DP6000 manufactured by the Data Precision Corporation of Danvers, Mass.

Figure 3:
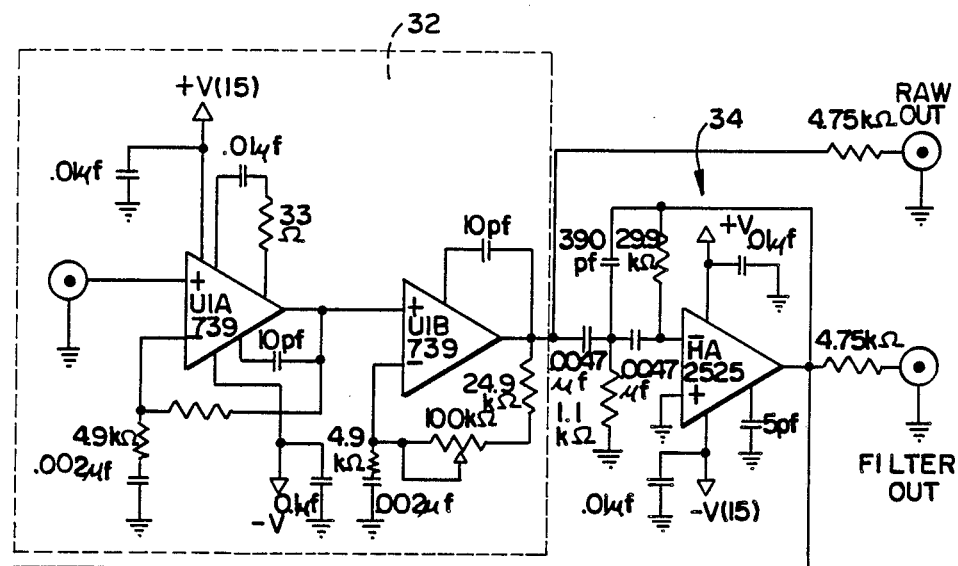
FIG. 3 schematically illustrates the processing means shown in FIG. 2.
Figure 3:
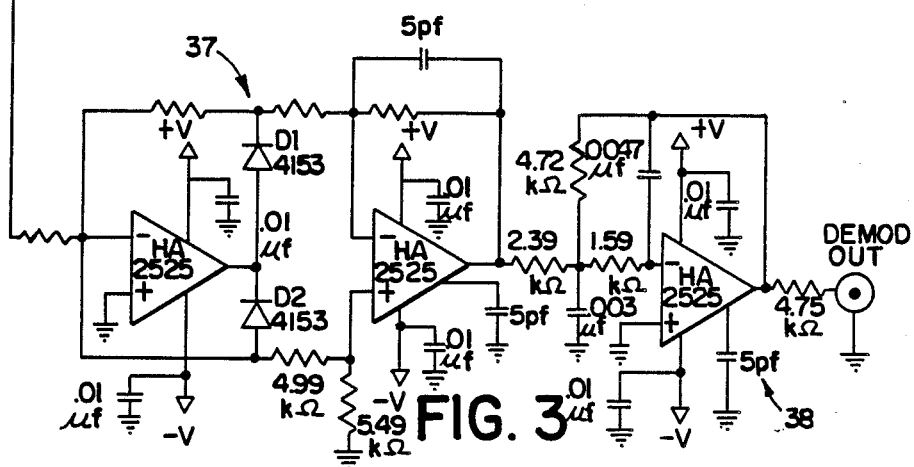
Figure 4:
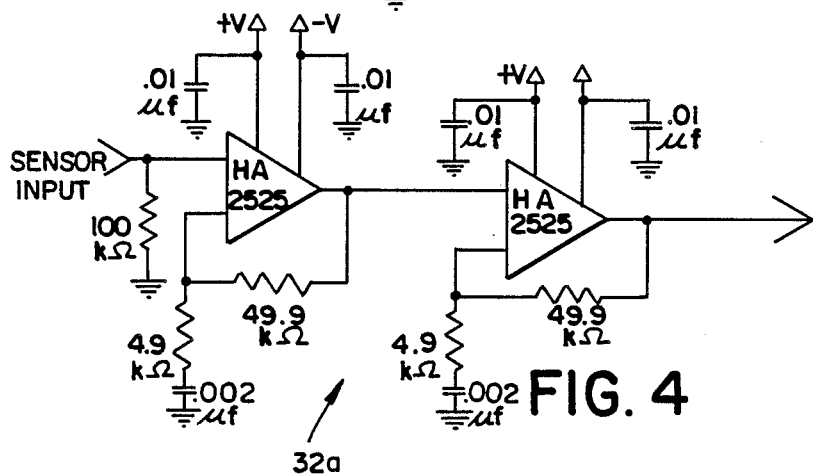
FIG. 4 shows an alternative schematic arrangement for the amplifier shown in FIG. 4.

A preferred embodiment of the processor means 28, as well as an alternative form of the amplifier 32 to be used with such processing means 28 will now be explained with reference to FIGS. 3 and 4. The amplifier 32 shown in FIG. 3, with exemplary components indicated therein, provides about 40 dB gain for the signal A before it is fed to the filter 34. An alternative amplifier 32a shown in FIG. 4, with exemplary components indicated therein, is more broader banded in nature than the filter 32 shown in FIG. 3, and has a flatter response up to about 500 kilohertz. A broad band approach to the detection of head-to-disk interference is preferable Filter 34 then passes the amplified signal A to the demodulator means 34, with the absolute value detector 35 providing a unity gain. Overall, the processing means 28 shown in FIGS. 3 and 4 provide about 60 dB gain between the signals A and B.

Obviously, many modifications and variations are possible in light of the above teachings. For example, the above described apparatus is not only useful in detecting head-to-disk interference, but is also useful in detecting other undesirable resonances which are manifestations of problems with spindle bearings, sliders and other mechanical components in conventional disk drive systems.

As a result, the high-pass filter 34 used for head-to-disk interference detection may be substituted in accordance with the present invention by a low-pass filter or a bandpass filter. Since manifestations of slider suspension resonances are typically found in the range of approximately 2 kilohertz, a low-pass filter would be substituted for the high-pass filter 34 shown in FIG. 2 in order to detect slider suspension resonances. In a similar manner, since air bearing resonances are typically found in the range of approximately 18 kilohertz and typically have a high Q factor, a bandpass filter would be substituted for the high-pass filter 34 in order to detect air bearing resonances. Filter 34 could also comprise a filter network, including each of the above described filters, for selectively diagnosing a number of problems associated with conventional disk drive systems. It is, therefore, to be understood that within the scope of the appended claims the present invention may be practiced otherwise than as specifically described herein.

What is claimed is:

1. In a disk drive system, the combination comprising:
    a head/disk assembly including a plurality of rotatable disks, a plurality of radially movable heads cooperating with said disks for transfer of data therebetween, and carriage means for supporting said heads;
    means, coupled to said carriage means, for conducting acoustic stress waves therefrom, said acoustic stress waves corresponding to vibrations caused by a mechanical interaction within the disk drive system;
    transducer means, coupled to said conductinq means, for sensing said acoustic stress waves and for outputting a first signal which is proportional thereto;
    processing means connected to receive said first signal for determining a degree of mechanical interaction, said processing means outputting a second signal; and
    means for displaying said second signal.

2. The combination according to claim 1, wherein said carriage means includes a threaded bore.

3. The combination according to claim 2, wherein said conducting means comprises a waveguide adapted to be coupled with said threaded bore.

4. The combination according to claim 3, wherein said waveguide comprises an aluminum rod.

5. The combination according to claim 1, wherein said processing means comprises:
    means for preamplifying said first signal;
    filter means, coupled to receive said preamplified first signal, for removing undesirable frequencies therefrom; and
    means for demodulating said preamplified and filtered first signal 6. The combination according to claim 5, wherein said demodulating means includes means for extracting time domain information from said first signal.

7. The combination according to claim 5, wherein said filter means comprises a high-pass filter.

8. The combination according to claim 5, wherein said filter means comprises a low-pass filter.

9. The combination according to claim 5, wherein said filter means comprises a bandpass filter.

10. The combination according to claim 5, wherein said filter means comprises:
    a filter network including at least one high-pass filter, at least one low-pass filter, and at least one bandpass filter; and
    means for selecting one of said filters included in said filter network.

11. The combination according to claim 1, wherein said transducer means comprises a piezoelectric sensor.

12. The combination according to claim 1, wherein said display means comprises a waveform analyzer.

13. The combination according to claim 1, wherein said mechanical interaction comprises head-to-disk interference.

14. A head-to-disk interference detector for use in a disk drive system having a head/disk assembly including a plurality of rotatable disks, a plurality of radially movable heads cooperating with the disks for transfer of data therebetween, and carriage means for supporting the heads, the carriage means including a threaded bore at a face thereof remote from the heads, wherein the detector comprises:
    means, coupled to the carriage means, for conducting acoustic stress waves therefrom, said acoustic stress waves corresponding to vibrations caused by an interaction between the disks and the heads;
    transducer means, coupled to said conducting means, for sensing said acoustic stress waves and for outputting a first signal which is proportional thereto;
    processing means connected to receive said first signal for determining the degree of head-to-disk interference, said processing means outputting a second signal; and
    means for displaying said second signal.

15. The detector according to claim 14, wherein said conducting means comprises a waveguide coupled to the threaded bore.

16. The detector according to claim 15, wherein said waveguide comprises an aluminum rod.

17. The detector according to claim 14, wherein said processing means comprises:
    means for preamplifying said first signal;
    a high-pass filter, coupled to receive said preamplified first signal, for removing undesirable frequencies below a preselected frequency therefrom;
    means, coupled to said high-pass filter, for demodulating a signal received therefrom.

18. The detector according to claim 17, wherein said demodulating means comprises an absolute value detector.

19. The detector according to claim 17, wherein said preselected frequency comprises approximately twenty kilohertz.

20. A method of detecting head-to-disk interference in a disk drive system having a plurality of rotatable disks, a plurality of radially movable heads cooperating with the disks for transfer of data therebetween, and carriage means for supporting the heads, the method comprising the steps of:
    conducting acoustic stress waves from the carriage means, said acoustic stress waves corresponding to vibrations caused by head-to-disk interference;

sensing said acoustic stress waves conducted from the carriage means by means matching the acoustic impedance thereof; and outputting a signal corresponding to said sensed acoustic stress waves to processing means for determining the degree of head-to-disk interference.

21. The method according to claim 20, wherein said outputting step comprises the steps of:

preamplifying said signal;

selectively filtering said preamplified signal to remove undesirable frequencies therefrom;

demodulating said filtered signal; and extracting time domain information from said demodulate signal for pulse height analysis.

22. The method according to claim 20, further comprising the step of displaying said signal on a waveform analyzer.

23. A method of detecting mechanical interaction in a disk drive system having one or more rotatable disks, one or more radially movable heads cooperating with the disks for transfer of data therebetween, and carriage means for supporting the heads in close juxtaposition with the disks, the method comprising the steps of:

conducting acoustic stress waves from the carriage means by impedance matching means, said acoustic stress waves corresponding to vibrations caused by the mechanical interaction;

sensing said acoustic stress waves;

processing said sensed acoustic stress waves to extract time domain information therefrom; and displaying said extracted information on a waveform analyzer.

24. The method according to claim 23, wherein said impedance matching means comprises an aluminum rod threadedly coupled to the carriage means.

25. The method according to claim 24, wherein said processing step comprises the steps of:

preamplifying a signal corresponding to said acoustic stress waves;

selectively filtering said preamplified signal; and demodulating said selectively filtered signal.

26. The method according to claim 25, wherein said selectively filtering step comprises the steps of:

providing a filter network, including a high-pass filter, a low-pass filter, and a bandpass filter;

coupling said filter network between said aluminum rod and said waveform analyzer; and selecting one of said high-pass, low-pass, and bandpass filters.

* * * * *